(12) United States Patent
Boutros et al.

(10) Patent No.: US 11,863,350 B2
(45) Date of Patent: Jan. 2, 2024

(54) FAST CONVERGENCE OF E-TREE WITH A DUAL HOMED ROOT NODE

(71) Applicant: Ciena Corporation, Hanover, MD (US)

(72) Inventors: Sami Boutros, Union City, CA (US);
Muthurajah Sivabalan, Kanata (CA);
David Gilson, Honolulu, HI (US)

(73) Assignee: Ciena Corporation, Hanover, MD (US)

( * ) Notice: Subject to any disclaimer, the term of this patent is extended or adjusted under 35 U.S.C. 154(b) by 72 days.

(21) Appl. No.: 17/470,315

(22) Filed: Sep. 9, 2021

(65) Prior Publication Data
US 2023/0073266 A1    Mar. 9, 2023

(51) Int. Cl.
| | |
|---|---|
| *H04L 12/46* | (2006.01) |
| *H04L 12/44* | (2006.01) |
| *H04L 45/00* | (2022.01) |
| *H04L 49/15* | (2022.01) |
| *H04L 45/48* | (2022.01) |

(52) U.S. Cl.
CPC ........ *H04L 12/4641* (2013.01); *H04L 12/44* (2013.01); *H04L 45/48* (2013.01); *H04L 45/66* (2013.01); *H04L 49/15* (2013.01); *H04L 2012/445* (2013.01)

(58) Field of Classification Search
CPC ..... H04L 12/4641; H04L 12/44; H04L 45/48; H04L 45/66; H04L 49/15; H04L 2012/445
See application file for complete search history.

(56) References Cited

U.S. PATENT DOCUMENTS

| | | | |
|---|---|---|---|
| 7,430,176 B2 | 9/2008 | Nalawade et al. | |
| 7,684,351 B2 | 3/2010 | Vasseur et al. | |
| 8,139,492 B1* | 3/2012 | Peterson | H04L 45/24 709/241 |
| 8,693,398 B1* | 4/2014 | Chaganti | H04L 67/1034 370/328 |
| 8,913,489 B2* | 12/2014 | Vinayagam | H04L 45/245 370/392 |
| 9,197,583 B2* | 11/2015 | Mullooly | H04L 45/58 |
| 9,729,387 B2* | 8/2017 | Agarwal | H04L 41/0654 |
| 9,979,629 B2 | 5/2018 | Sivabalan et al. | |
| 10,003,531 B2* | 6/2018 | Zhou | H04L 12/4641 |
| 10,033,623 B2 | 7/2018 | Jain et al. | |
| 10,158,558 B1 | 12/2018 | Ward et al. | |
| 10,165,093 B2 | 12/2018 | Filsfils et al. | |
| 10,171,338 B2 | 1/2019 | Filsfils et al. | |

(Continued)

FOREIGN PATENT DOCUMENTS

EP    3 038 301 B1    3/2020

*Primary Examiner* — Wutchung Chu
(74) *Attorney, Agent, or Firm* — Baratta Law PLLC; Lawrence A. Baratta, Jr.

(57) ABSTRACT

A Provider Edge (PE) node includes a plurality of ports including an inter-chassis port to a second PE node, a port connected to a root node, and one or more ports connected to leaf nodes, wherein the plurality of ports are in an Ethernet Tree (E-Tree), and wherein the root node is dual-homed to the PE node and the second PE node; switching circuitry configured to switch traffic between the plurality of ports; and circuitry configured to designate the inter-chassis port as one of a leaf node and a root node in the E-Tree instance, and manage a designation of the inter-chassis port based on a status of the port connected to the root node. The designation is changed in a data plane instead of in a control plane.

20 Claims, 4 Drawing Sheets

(56) References Cited

U.S. PATENT DOCUMENTS

| | | |
|---|---|---|
| 10,250,494 B2 | 4/2019 | Sivabalan et al. |
| 10,277,558 B2 | 4/2019 | Khan et al. |
| 10,291,516 B2 | 5/2019 | Bryant et al. |
| 10,454,821 B2 | 10/2019 | Filsfils et al. |
| 10,567,295 B2 | 2/2020 | Barton et al. |
| 10,721,163 B1* | 7/2020 | Kalyanaraman ........ H04L 45/48 |
| 10,740,408 B2 | 8/2020 | Ramasamy et al. |
| 10,833,976 B2 | 11/2020 | Saad et al. |
| 10,868,755 B2 | 12/2020 | Filsfils et al. |
| 11,552,879 B1* | 1/2023 | Sivabalan ............ H04L 43/0811 |
| 2008/0118068 A1* | 5/2008 | Kim .................... H04L 9/0891 380/278 |
| 2010/0020680 A1* | 1/2010 | Salam ................ H04L 41/0677 370/220 |
| 2011/0032945 A1* | 2/2011 | Mullooly ................ H04L 45/58 370/401 |
| 2012/0155484 A1* | 6/2012 | Sergeev ................ H04L 12/437 370/405 |
| 2012/0182866 A1* | 7/2012 | Vinayagam ........... H04L 45/245 370/256 |
| 2012/0300784 A1* | 11/2012 | Jiang .................... H04L 12/462 370/395.53 |
| 2013/0064102 A1* | 3/2013 | Chang .................... H04L 49/70 370/255 |
| 2013/0073711 A1* | 3/2013 | Hanka .................. H04L 49/552 709/223 |
| 2014/0056122 A1* | 2/2014 | Singal .................... H04L 45/28 370/220 |
| 2014/0286345 A1* | 9/2014 | Mohandas .............. H04L 49/25 370/401 |
| 2015/0006755 A1* | 1/2015 | Turlington ............ H04L 47/326 709/233 |
| 2015/0188808 A1* | 7/2015 | Ghanwani ............... H04L 47/15 709/244 |
| 2016/0057049 A1 | 2/2016 | Jacobson et al. |
| 2016/0119229 A1* | 4/2016 | Zhou .................. H04L 12/4633 370/392 |
| 2016/0191324 A1 | 6/2016 | Olofsson et al. |
| 2017/0085488 A1* | 3/2017 | Bhattacharya ........ H04L 41/122 |
| 2017/0118042 A1* | 4/2017 | Bhattacharya ........ H04L 12/462 |
| 2017/0287100 A1* | 10/2017 | Liktor .................... G06T 17/005 |
| 2017/0317919 A1* | 11/2017 | Fernando ................ H04L 41/40 |
| 2018/0083794 A1* | 3/2018 | Otake .................. H04L 12/1854 |
| 2018/0254985 A1* | 9/2018 | Ballard ................. H04L 45/583 |
| 2019/0132241 A1* | 5/2019 | Vattem ................ H04L 12/4633 |
| 2019/0297017 A1 | 9/2019 | Pignataro et al. |
| 2019/0363975 A1* | 11/2019 | Djernaes ................. H04L 45/04 |
| 2019/0379601 A1 | 12/2019 | Khan et al. |
| 2020/0112495 A1 | 4/2020 | Attarwala et al. |
| 2020/0153856 A1 | 5/2020 | Nainar et al. |
| 2020/0220811 A1 | 7/2020 | Shah |
| 2021/0092043 A1 | 3/2021 | Filsfils et al. |
| 2021/0160174 A1 | 5/2021 | Kashyap et al. |
| 2021/0243095 A1 | 8/2021 | Attarwala et al. |

* cited by examiner

FAST CONVERGENCE OF E-TREE WITH A DUAL HOMED ROOT NODE

FIELD OF THE DISCLOSURE

The present disclosure generally relates to networking. More particularly, the present disclosure relates to systems and methods for fast convergence of E-Tree (Ethernet Tree) with a dual homed root node.

BACKGROUND OF THE DISCLOSURE

An Ethernet-Tree (E-Tree) service is defined by Metro Ethernet Forum (MEF) as a Rooted-Multipoint Ethernet Virtual Connection (EVC) service. The Ethernet frames from a root node may be received by any other root node or leaf node, and the frames from a leaf node may be received by any root node but must not be received by a leaf node. The same E-Tree can have multiple root nodes attached to the same Provider Edge (PE) or multiple PEs in the same E-tree Service. EVPN technology is replacing the legacy Pseudowire (PW) technology for Layer 2 (L2)-Virtual Private LAN (Local Area Network) Service (VPLS) and Virtual Private Wire Service (VPWS). EVPN is described, e.g., in RFC 7209, "Requirements for Ethernet VPN (EVPN)," May 2014, RFC 7432, "BGP MPLS-Based Ethernet VPN," February 2015, and RFC 8365, "A Network Virtualization Overlay Solution Using Ethernet VPN (EVPN)," March 2018, the contents of each are incorporated by reference. EVPN can be used to realize the E-Tree.

This disclosure relates to an E-Tree with one Root Customer Edge (CE) node connected to root ports on a Provider Edge (PE) and dual homed in Active/Standby (A/S) redundancy to a cluster of two PEs and multiple leaf CE nodes connecting to leaf ports on the PEs. In this configuration, EVPN requires significant control messages exchange on a failure, exchanging of many route types leading to much longer convergence time. EVPN is not really optimized for this kind of topology described above and herein.

BRIEF SUMMARY OF THE DISCLOSURE

The present disclosure relates to systems and methods for fast convergence of E-Tree (Ethernet Tree) with a dual homed root node. In the configuration described herein, the present disclosure proposes a new port between the cluster of two PEs, namely an inter-chassis port. The E-tree instance, in the cluster of two PEs, changes dynamically and instantly in data plane between root to leaf, or vice versa, based on the root port connected to a root CE node change state. For a given PE in the cluster, if the PE root port to the root CE node is up, then the inter-chassis port on this PE will be acting as a leaf, and if the PE root port is down, then the inter-chassis port will be acting as a root. The reversing of roles (leaf or root) on the two PEs will happen independently and faster than a control-plane driven mechanism. A benefit of this approach include operation with minimal or no routing control plane such as EVPN. Another benefit includes the use of existing Layer 2 (L2) data plane legacy transport and data plane mechanisms to tie the dual home PEs inter-chassis link root/leaf designation with the status of the access link of the root node to achieve Single-Active and Active-Active with milliseconds convergence on link or node failures.

In an embodiment, a Provider Edge (PE) node includes a plurality of ports including an inter-chassis port to a second PE node, a port connected to a root node, and one or more ports connected to leaf nodes, wherein the plurality of ports are in an Ethernet Tree (E-Tree), and wherein the root node is dual-homed to the PE node and the second PE node; switching circuitry configured to switch traffic between the plurality of ports; and circuitry configured to designate the inter-chassis port as one of a leaf node and a root node in the E-Tree instance, and manage a designation of the inter-chassis port based on a status of the port connected to the root node. The designation is changed in a data plane instead of in a control plane. Responsive to a failure on the port connected to the root node, the designation of the inter-chassis port can be changed. The dual-homed can be Active/Standby or Active/Active. The inter-chassis port can be a Virtual Local Area Network (VLAN) interface. The inter-chassis port can utilize an Inclusive Multicast Ethernet Tag (IMET).

In another embodiment, a method is implemented in a Provider Edge (PE) node comprising a plurality of ports including an inter-chassis port to a second PE node, a port connected to a root node, and one or more ports connected to leaf nodes, wherein the plurality of ports are in an Ethernet Tree (E-Tree), and wherein the root node is dual-homed to the PE node and the second PE node. The method includes steps of designating the inter-chassis port as one of a leaf node and a root node in the E-Tree instance; and managing a designation of the inter-chassis port based on a status of the port connected to the root node. The designation is changed in a data plane instead of in a control plane. Responsive to a failure on the port connected to the root node, the designation of the inter-chassis port can be changed. The dual-homed can be Active/Standby or Active/Active. The inter-chassis port can be a Virtual Local Area Network (VLAN) interface. The inter-chassis port can utilize an Inclusive Multicast Ethernet Tag (IMET).

In a further embodiment, a non-transitory computer-readable medium includes instructions that, when executed, cause at least one processor in a Provider Edge (PE) node to perform steps. The PE node includes a plurality of ports including an inter-chassis port to a second PE node, a port connected to a root node, and one or more ports connected to leaf nodes, wherein the plurality of ports are in an Ethernet Tree (E-Tree), and wherein the root node is dual-homed to the PE node and the second PE node. The steps include designating the inter-chassis port as one of a leaf node and a root node in the E-Tree instance; and managing a designation of the inter-chassis port based on a status of the port connected to the root node. The designation is changed in a data plane instead of in a control plane. Responsive to a failure on the port connected to the root node, the designation of the inter-chassis port can be changed. The dual-homed can be Active/Standby or Active/Active.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 illustrates unicast and BUM traffic from a root, and FIG. 2 illustrates unicast and BUM traffic from a leaf.

DETAILED DESCRIPTION OF THE DISCLOSURE

Again, the present disclosure relates to systems and methods for fast convergence of E-Tree (Ethernet Tree) with a dual homed root node. In the configuration described herein, the present disclosure proposes a new port between the cluster of two PEs, namely an inter-chassis port. The E-tree instance, in the cluster of two PEs, changes dynamically and instantly in data plane between root to leaf, or vice versa, based on the root port connected to a root CE node change state. For a given PE in the cluster, if the PE root port to the root CE node is up, then the inter-chassis port on this PE will be acting as a leaf, and if the PE root port is down, then the inter-chassis port will be acting as a root. The reversing of roles (leaf or root) on the two PEs will happen independently and faster than a control-plane driven mechanism. A benefit of this approach include operation with minimal or no routing control plane such as EVPN. Another benefit includes the use of existing Layer 2 (L2) data plane legacy transport and data plane mechanisms to tie the dual home PEs inter-chassis link root/leaf designation with the status of the access link of the root node to achieve Single-Active and Active-Active with milliseconds convergence on link or node failures.

Acronyms

The following acronyms, abbreviations, and definitions are utilized herein:

| | |
|---|---|
| A/A | Active/Active; used synonymously with all-active when a CE is multi-homed to two or more PEs |
| A/S | Active/Standby used synonymously with single-active when CE is multi-homed to two or more PEs |
| AC | Attachment Circuit |
| ARP | Address Resolution Protocol |
| BGP | Border Gateway Protocol |
| BUM | Broadcast, Unknown, and Multicast |
| CE | Customer Edge |
| DF | Designated Forwarder; DF algorithm is used on MH (PE) peers to elect DF for each VLAN |
| DMAC | Destination MAC |
| DH | Dual-Home |
| DP | Data Plane |
| ES | Ethernet Segment; when a CE is MH to PEs via a LAG, MH (PE) peers identify LAG interface as Ethernet Segment |
| E-Tree | Ethernet Tree |
| EVPN | Ethernet VPN |
| EVI | Ethernet VPN Instance |
| ICCP | Inter-Control Center Communications Protocol |
| IMET | Inclusive Multicast Ethernet Tag |
| IGP | Interior Gateway Protocol |
| IP | Internet Protocol |
| LAG | Link Aggregation Group |
| LAN | Local Area Network |
| MAC | Media Access Control |
| MH | Multi-home |
| MPLS | Multiprotocol Label Switching |
| PE | Provider Edge |
| PW | Pseudowire |
| RT | Route Target; EVPN uses BGP RTs with import/export policy to form EVI member group |
| SID | Segment Identifier |
| SMAC | Source MAC |
| UNI | User-Network Interface |
| VLAN | Virtual Local Area Network |
| VPLS | Virtual Private LAN Service |
| VPN | Virtual Private Network |
| VPWS | Virtual Private Wire Service |
| Leaf | A node in an E-Tree that is allowed to communicate only to Root nodes |
| Root | A node in an E-Tree that is allowed to communicate to other Root and Leaf nodes |

Network Configuration

Figure 1:
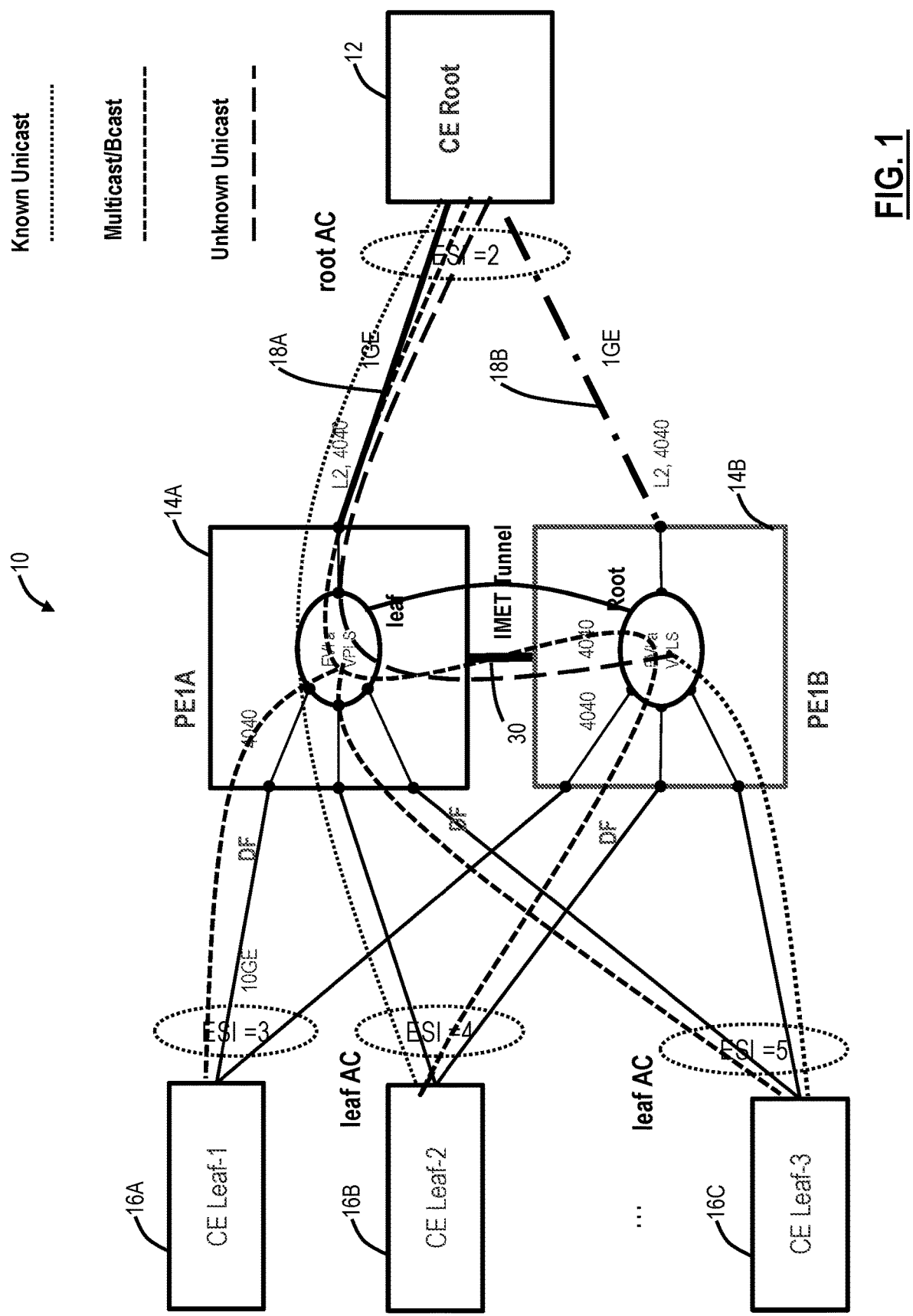
FIGS. 1 and 2 are network diagrams of a network that is an E-Tree with one root CE node dual-homed connected to two PE nodes which in turn connect to various CE leaf nodes.
Figure 2:
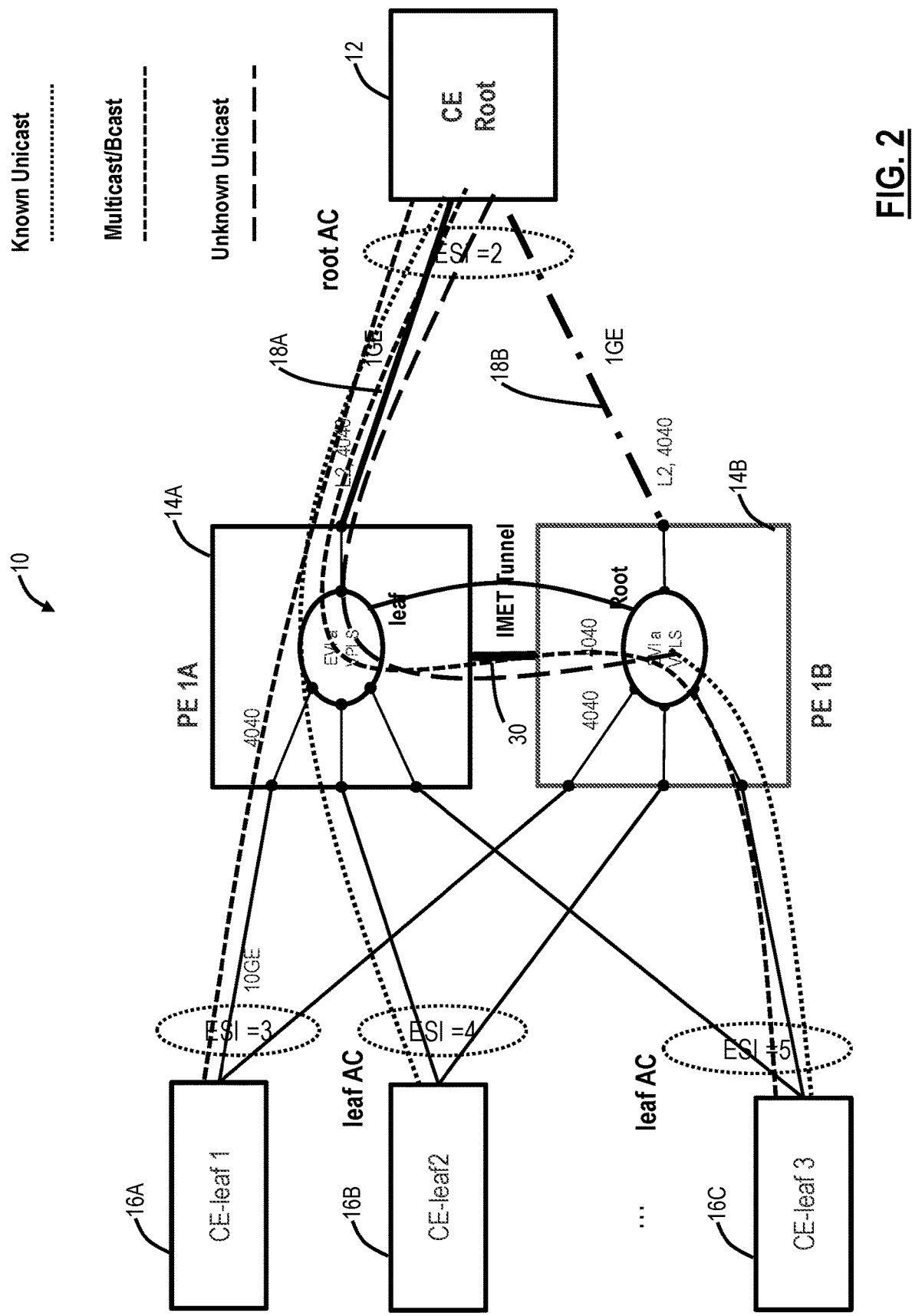
Figure 3:
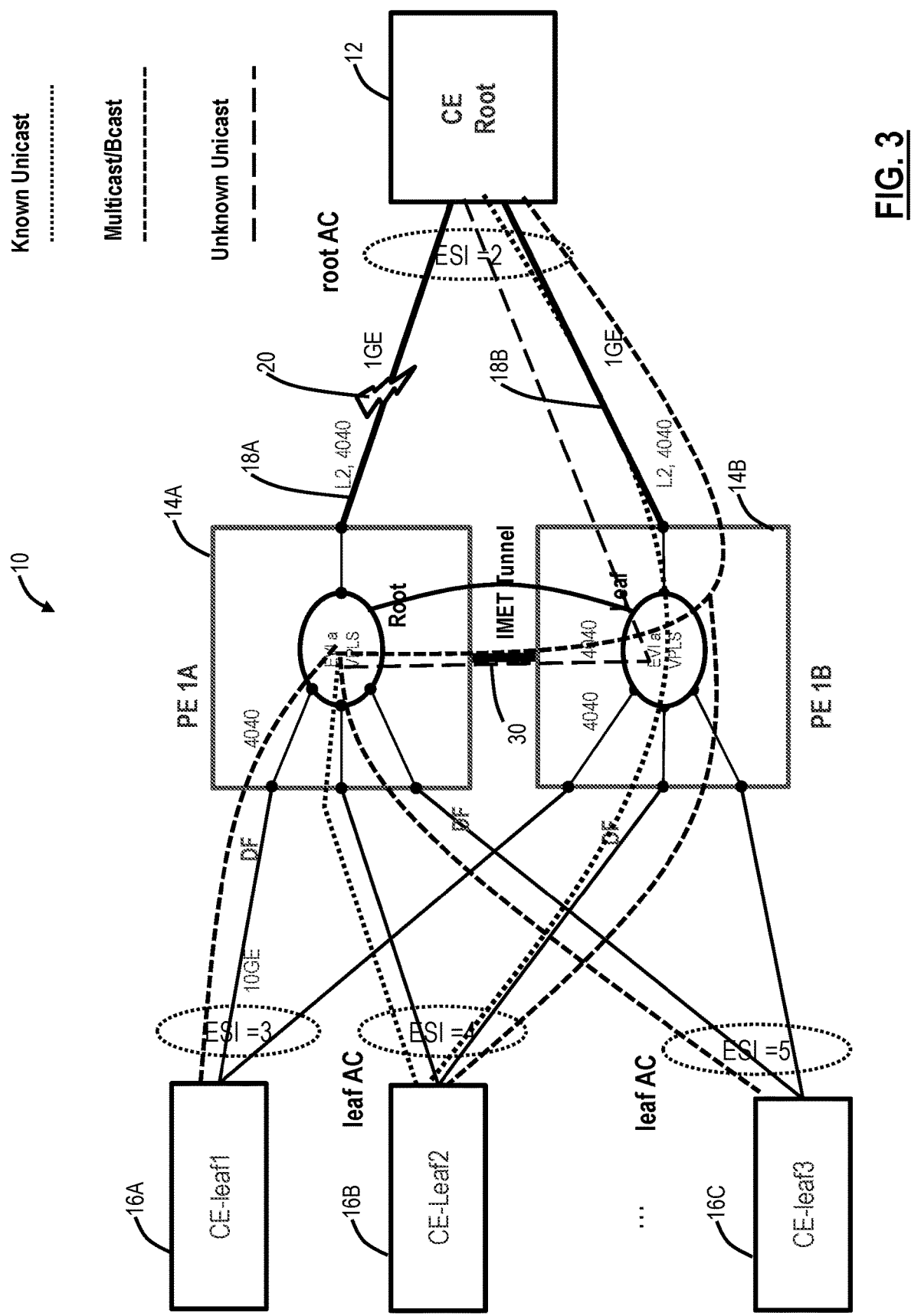
FIG. 3 is a network diagram of the network illustrating a fault affecting the link.

FIGS. 1 and 2 are network diagrams of a network 10 that is an E-Tree with one root CE node 12 dual-homed connected to two PE nodes 14A, 14B which in turn connect to various CE leaf nodes 16A, 16B, 16C. FIG. 1 illustrates unicast and BUM traffic from a root, and FIG. 2 illustrates unicast and BUM traffic from a leaf. FIGS. 1 and 2 show a non-fault situation on dual-homed links 18A, 18B between the CE root node 12 and the PE nodes 14A, 14B. In FIGS. 1 and 2, known unicast traffic, multicast and broadcast traffic, and unknown unicast traffic is shown. In the working state with no fault, traffic flows on the link 18A. FIG. 3 is a network diagram of the network 10 illustrating a fault 20 affecting the link 18A.

Of note, the various connections in FIGS. 1-3 may include intermediate devices which are omitted for illustration purposes. As described herein, "connected to" may or may not be a direct connection.

In the conventional approach, following the fault 20, the control plane in EVPN exchanges route type messages for reconfiguration. Again, as noted herein, this process is slow.

The present disclosure includes new ports between the two PE nodes 14A, 14B connected as a connection 30 that is part of the E-Tree instance. The connection 30 can be an Inclusive Multicast Ethernet Tag (IMET) route/tunnel. The connection 30 includes a port on each of the PE nodes 14A, 14B that is either a root or leaf in the E-Tree. Physically, the connection 30 is a connection between the PE nodes 14A, 14B, and it can be referred to as an inter-chassis link/inter-chassis port. This inter-chassis port associated with the E-Tree instance can be a VLAN interface on a physical link The key is to have this inter-chassis port between the two PE nodes 14A, 14B, in a cluster and in the E-tree instance, change dynamically and instantly in the data plane from root to leaf (or vice versa) based upon the state of the links 18A, 18B. If the PE root port to the root CE node 12 is up, then the inter-chassis port on this PE node 14W will be acting as leaf, as illustrated in FIGS. 1 and 2, and if the PE root port is down, then the inter-chassis port will be acting as root, as illustrated in FIG. 3, due to the fault 20.

The role changing from root to leaf on the inter-chassis port associated with the E-Tree instance will change dynamically by the data plane with no control plane involvement as soon as the single root port on that PE change state, leading to the fastest convergence possible. Again, the current EVPN control plane mechanism will require control plane message exchange to setup the E-Tree and would require an MPLS transport between the PE nodes 14A, 14B too, as well would require egress filtering for BUM traffic, and will require control plane MAC learning for the E-Tree instance.

This is all removed by tying the inter-chassis port role as leaf or root within the E-Tree instance, and changing it dynamically with no control plane involvement.

Benefits

Use of the inter-chassis port achieve in the order of milliseconds convergence for E-Tree network topologies on link failure with Active/Standby redundancy. This also is a simpler approach to support NA and A/S redundancy for E-Tree with no need for heavy control planes like EVPN.

Further, This can work with legacy Layer 2 (L2) transport for active/standby redundancy, i.e. doesn't require any EVPN control plane which is a huge benefit and even for Active/Active redundancy only need to use EVPN for DF election for NA redundancy to send BUM traffic to only one of the active Port connected to one of the Dual home PE.

Unique to this approach, the data plane changes the role of the inter-chassis port from leaf to root (or vice versa) based on the state of the customer root port. This is unique from EVPN, ICCP, etc. which do not allow the data plane to perform a control plane role to switch a port designation from root to leaf or vice versa. The benefit here is no control plane involvement at all after setting up the data plane, leading to no control plane involvement at all for switchover on failure or for recovery from failure.

Process

Figure 4:
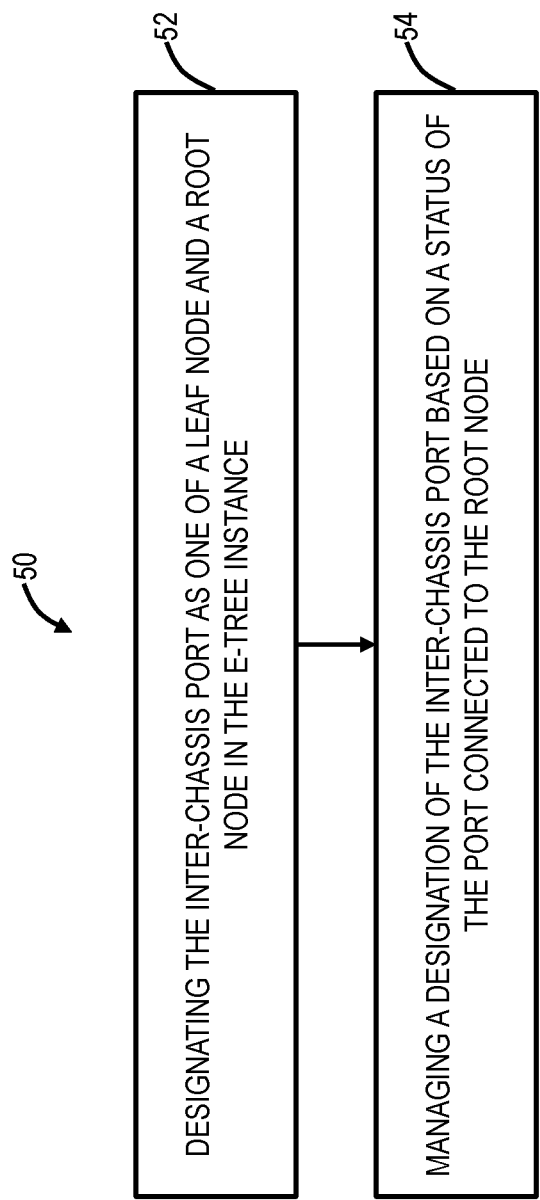
FIG. 4 is a flowchart of process for fast convergence of an E-Tree (Ethernet Tree) with a dual homed root node.

FIG. 4 is a flowchart of process 50 for fast convergence of an E-Tree (Ethernet Tree) with a dual homed root node. The process 50 can be implemented as a method with steps, via one (or both) or the PE nodes 14A, 14B which include circuitry or at least one processor configured to implement the steps, and as instructions stored in a non-transitory computer-readable medium for the steps.

The process 50 is implemented in a Provider Edge (PE) node having a plurality of ports including an inter-chassis port to a second PE node, a port connected to a root node, and one or more ports connected to leaf nodes, wherein the plurality of ports are in an Ethernet Tree (E-Tree), and wherein the root node is dual-homed to the PE node and the second PE node.

The steps in the process 50 include designating the inter-chassis port as one of a leaf node and a root node in the E-Tree instance (step 52); and managing a designation of the inter-chassis port based on a status of the port connected to the root node (step 54). The designation is one of a root or a leaf in the E-Tree.

The designation is changed in a data plane instead of in a control plane. Responsive to a failure on the port connected to the root node, the designation of the inter-chassis port is changed. The dual-homed can be Active/Standby or Active/Active.

The inter-chassis port can be a Virtual Local Area Network (VLAN) interface. The inter-chassis port can utilize an Inclusive Multicast Ethernet Tag (IMET).

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A Provider Edge (PE) node comprising:
a plurality of ports including an inter-chassis port to a second PE node, a port connected to a root node, and one or more ports connected to leaf nodes, wherein the plurality of ports are in an Ethernet Tree (E-Tree) where Ethernet frames from a root node are received by any other root node or leaf node, and Ethernet frames from a leaf node are received only by a root node, and wherein the root node is dual-homed to the PE node and the second PE node;
switching circuitry configured to switch traffic between the plurality of ports; and
circuitry configured to
designate the inter-chassis port as one of a leaf node and a root node in the E-Tree, wherein the inter-chassis port forms a connection between the PE node and the second PE node with the connection being a link in the E-Tree, and
manage a designation of the inter-chassis port based on a status of the port connected to the root node.

2. The Provider Edge (PE) node of claim 1, wherein the designation is changed in a data plane instead of in a control plane.

3. The Provider Edge (PE) node of claim 1, wherein, responsive to a failure on the port connected to the root node, the designation of the inter-chassis port is changed.

4. The Provider Edge (PE) node of claim 1, wherein the dual-homed is Active/Standby.

5. The Provider Edge (PE) node of claim 1, wherein the dual-homed is Active/Active.

6. The Provider Edge (PE) node of claim 1, wherein the inter-chassis port is a Virtual Local Area Network (VLAN) interface.

7. The Provider Edge (PE) node of claim 1, wherein the inter-chassis port utilizes an Inclusive Multicast Ethernet Tag (IMET).

8. A method, implemented in a Provider Edge (PE) node comprising a plurality of ports including an inter-chassis port to a second PE node, a port connected to a root node, and one or more ports connected to leaf nodes, wherein the plurality of ports are in an Ethernet Tree (E-Tree) where Ethernet frames from a root node are received by any other root node or leaf node, and Ethernet frames from a leaf node are received only by a root node, and wherein the root node is dual-homed to the PE node and the second PE node, wherein the method comprises steps of:
designating the inter-chassis port as one of a leaf node and a root node in the E-Tree, wherein the inter-chassis port forms a connection between the PE node and the second PE node with the connection being a link in the E-Tree; and
managing a designation of the inter-chassis port based on a status of the port connected to the root node.

9. The method of claim 8, wherein the designation is changed in a data plane instead of in a control plane.

10. The method of claim 8, wherein, responsive to a failure on the port connected to the root node, the designation of the inter-chassis port is changed.

11. The method of claim 8, wherein the dual-homed is Active/Standby.

12. The method of claim 8, wherein the dual-homed is Active/Active.

13. The method of claim 8, wherein the inter-chassis port is a Virtual Local Area Network (VLAN) interface.

14. The method of claim 8, wherein the inter-chassis port utilizes an Inclusive Multicast Ethernet Tag (IMET).

15. A non-transitory computer-readable medium comprising instructions that, when executed, cause at least one processor in a Provider Edge (PE) node, which includes a plurality of ports including an inter-chassis port to a second PE node, a port connected to a root node, and one or more ports connected to leaf nodes, wherein the plurality of ports are in an Ethernet Tree (E-Tree) where Ethernet frames from a root node are received by any other root node or leaf node, and Ethernet frames from a leaf node are received only by a root node, and wherein the root node is dual-homed to the PE node and the second PE node, to perform steps comprising:
designating the inter-chassis port as one of a leaf node and a root node in the E-Tree, wherein the inter-chassis port forms a connection between the PE node and the second PE node with the connection being a link in the E-Tree; and
managing a designation of the inter-chassis port based on a status of the port connected to the root node.

16. The non-transitory computer-readable medium of claim 15, wherein the designation is changed in a data plane instead of in a control plane.

17. The non-transitory computer-readable medium of claim 15, wherein, responsive to a failure on the port connected to the root node, the designation of the inter-chassis port is changed.

18. The non-transitory computer-readable medium of claim 15, wherein the dual-homed is Active/Standby.

19. The non-transitory computer-readable medium of claim 15, wherein the dual-homed is Active/Active.

20. The non-transitory computer-readable medium of claim 15, wherein the inter-chassis port one of i) is a Virtual Local Area Network (VLAN) interface, and ii) utilizes an Inclusive Multicast Ethernet Tag (IMET).

\* \* \* \* \*